(12) United States Patent
Hsiao et al.

(10) Patent No.: US 7,035,854 B2
(45) Date of Patent: Apr. 25, 2006

(54) CONTENT MANAGEMENT SYSTEM AND METHODOLOGY EMPLOYING NON-TRANSFERABLE ACCESS TOKENS TO CONTROL DATA ACCESS

(75) Inventors: Hui-I Hsiao, Saratoga, CA (US);
Matthew Laue, San Jose, CA (US);
Cataldo Mega, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 10/128,503

(22) Filed: Apr. 23, 2002

(65) Prior Publication Data

US 2003/0200202 A1    Oct. 23, 2003

(51) Int. Cl.
*G06F 17/30* (2006.01)
*G06F 17/00* (2006.01)

(52) U.S. Cl. .............................. 707/9; 707/1; 707/102; 707/103 R

(58) Field of Classification Search ................ 707/1–4, 707/9–10, 102–103 Z, 103 R
See application file for complete search history.

(56) References Cited

U.S. PATENT DOCUMENTS

| | | | |
|---|---|---|---|
| 4,751,740 A | 6/1988 | Wright | |
| 4,969,091 A | 11/1990 | Muller | |
| 5,615,337 A | 3/1997 | Zimowski et al. | |
| 5,644,768 A | 7/1997 | Periwal et al. | |
| 5,742,810 A | 4/1998 | Ng et al. | |
| 5,774,719 A | 6/1998 | Bowen | |
| 5,778,398 A | 7/1998 | Nagashima et al. | |
| 5,799,310 A | 8/1998 | Anderson et al. | |
| 5,819,252 A | 10/1998 | Benson et al. | |
| 5,862,378 A | 1/1999 | Wang et al. | |
| 5,875,332 A | 2/1999 | Wang et al. | |
| 5,892,902 A | 4/1999 | Clark | |
| 5,940,616 A | 8/1999 | Wang | |
| 6,012,067 A | 1/2000 | Sarkar | |
| 6,016,394 A | 1/2000 | Walker | |
| 6,047,291 A | 4/2000 | Anderson et al. | |
| 6,055,637 A | 4/2000 | Hudson et al. | |
| 6,063,133 A | 5/2000 | Li et al. | |
| 6,065,117 A | 5/2000 | White | |
| 6,067,414 A | 5/2000 | Wang et al. | |

(Continued)

FOREIGN PATENT DOCUMENTS

WO    WO 99/22362    5/1999

OTHER PUBLICATIONS

Jeonghee Kim, Taissok Han, and Suk Kyoon Lee, "Visualization of Path Expressions in a Visual Object-Oriented Database Query Language," (2 pages).

(Continued)

*Primary Examiner*—Alford W. Kindred
(74) *Attorney, Agent, or Firm*—Hovey Williams LLP

(57) ABSTRACT

A method is provided for accessing information in a content management system including a library server for generating non-transferable access tokens and an object server for storing objects to which access may be requested by a client user. Enhanced security is achieved by generating non-transferable access tokens which can be used by a particular client user to access a particular data object in the object server. However, should the token be transferred to a user other then the client user for which the token was generated, the system will not permit access to the object.

16 Claims, 4 Drawing Sheets

U.S. PATENT DOCUMENTS

| | | | |
|---|---|---|---|
| 6,088,524 | A | 7/2000 | Levy et al. |
| 6,104,393 | A | 8/2000 | Santos-Gomez |
| 6,128,621 | A | 10/2000 | Weisz |
| 6,148,342 | A | 11/2000 | Ho |
| 6,161,182 | A | 12/2000 | Nadooshan |
| 6,167,405 | A | 12/2000 | Rosensteel, Jr. et al. |
| 6,173,400 | B1 | 1/2001 | Perlman et al. |
| 6,219,826 | B1 | 4/2001 | De Pauw et al. |
| 6,233,586 | B1 | 5/2001 | Chang et al. |
| 6,263,313 | B1 | 7/2001 | Milsted et al. |
| 6,263,342 | B1 | 7/2001 | Chang et al. |
| 6,279,111 | B1 | 8/2001 | Jensenworth et al. |
| 6,282,649 | B1 | 8/2001 | Lambert et al. |
| 6,289,344 | B1 | 9/2001 | Braia et al. |
| 6,289,458 | B1 | 9/2001 | Garg et al. |
| 6,292,936 | B1 | 9/2001 | Wang |
| 6,308,274 | B1 | 10/2001 | Swift |
| 6,314,449 | B1 | 11/2001 | Gallagher et al. |
| 6,327,629 | B1 | 12/2001 | Wang et al. |
| 6,338,056 | B1 | 1/2002 | Dessloch et al. |
| 6,339,777 | B1 | 1/2002 | Attaluri et al. |
| 6,343,286 | B1 | 1/2002 | Lee et al. |
| 6,687,707 | B1 * | 2/2004 | Shorter .................. 707/103 R |
| 2001/0002486 | A1 | 5/2001 | Kocher et al. |
| 2001/0008015 | A1 | 7/2001 | Vu et al. |
| 2001/0019614 | A1 | 9/2001 | Madoukh |
| 2005/0027725 | A1 * | 2/2005 | Kagalwala et al. ......... 707/100 |

OTHER PUBLICATIONS

Chien-I Lee, Ye-In Chang, and Wei-Pang Yang, "Design Of A New Indexing Organization For A Class-Aggregation Hierarchy In Object-Oriented Databases", Journal of Information Science and Engineering 15, 1999, pp. 217-241, Taiwan.

Jörn W. Janneck and Martin Naedele, "Modeling Hierarchical and Recursive Structures Using Parametric Petri Nets." Computer Engineering and Networks Laboratory, Swiss Federal Institute of Technology Zurich, pp. 445-452.

Akira Kawaguchi, Daniel Lieuwen, Inderpal Mumick, Kenneth Ross, "Implementing Incremental View Maintenance in Nested Data Models" Database Programming Languages, 6th International Workshop, DBPL-6, Aug. 18-20, 1997 Proceedings, pp. 203-221.

Li Tian-Zhu, "Normalization of Nested Structure for Complex Objects" in Chinese, Journal of Software, vol. 9, No. 5, p. 390-396, May 1998, (with English Abstract).

* cited by examiner

CONTENT MANAGEMENT SYSTEM AND METHODOLOGY EMPLOYING NON-TRANSFERABLE ACCESS TOKENS TO CONTROL DATA ACCESS

FIELD OF THE INVENTION

The disclosures herein relate generally to databases and more particularly to methods and apparatus for controlling access to content management systems.

BACKGROUND

Conventional content management systems, such as that shown in FIG. 1, typically include a Library Server (LS), one or more Resource Managers (RMs) and a client access application program interface (API). A client is coupled by a network to the API and seeks information stored in the Resource Manager. The Library Server stores metadata relating to all objects or data stored in the Resource Manager. The Library Server also controls the particular objects that a particular client user can access. The Library Server governs the level of access permitted a particular user, for example, 1) read access, 2) write access, 3) play, 4) update, 5) delete and so forth.

Users can submit requests through the API to search or retrieve metadata stored in the Library Server or objects stored in the Resource Manager. In one conventional access management method, the client user must obtain permission in the form of an access token from the Library Server prior to accessing a specific object stored in the Resource Manager. In this method the client user first sends a request to the Library Server asking to access one or more particular objects. The Library Server tests to determine if the client user has the privilege to access the particular object. If the client user is found to have the appropriate privilege, the Library Server generates a unique object ID (object identification) and an associated access token for each requested object. The object ID's and respective tokens are transmitted back to the client user. The client user then uses the object ID and respective access token to access objects stored in the Resource Manager. When the Resource Manager receives a request for an object from the client user, it validates the access token against the requested object. If the token is valid, the Resource Manager grants the request for access to the object and the object is transmitted to the client user. If the token is not found to be valid, the Resource Manager rejects the request for access.

Conventional token-based access control mechanisms such as that described above allow access tokens to be freely passed from one user to another. Such tokens are typically referred to as "transferable tokens". Transferable tokens permit users who have obtained an access token from the Library Server to pass it along to other users. The Resource Manager does not check to determine if the user possessing the access token is the same user who originally obtained the access token from the Library Server.

This conventional token-based access control mechanism provides a good solution for managing access to objects stored in Resource Managers. Unfortunately, however, if the token falls into the wrong hands, an unintended party may access the information corresponding to the token.

What is needed is a mechanism and methodology to provide higher security to token-based access content management systems by denying access should the token fall into the wrong hands.

SUMMARY

Accordingly, in one embodiment a method of accessing information in a content management system is provided. The method includes receiving, by the system, a request from a client user for an object stored in the system. The method also includes generating, by the system, a unique object identifier associated with the requested object. The method further includes generating, by the system, a non-transferable access token coded with information unique to the client user such that when submitted to the system by a user other than the client user, the system denies access to the requested object.

A principal advantage of the embodiment disclosed herein is enhanced security with respect to access to objects stored in a content management system. Access tokens are prevented from being employed by users other than the original client user when such restricted access is desired.

DETAILED DESCRIPTION

A secure access token generation mechanism is needed to provide object access control and protection. One possible solution is to generate an access token by encrypting the unique object ID or any unique object ID with the public key of the resource manager for which it was intended. Unfortunately, this approach has the disadvantage that it would allow any user who knows the format of a decrypted token (e.g. the unique object ID) and who has access to the public key of the resource manager to create their own access tokens. This problem could be solved by keeping the "public" key of the resource manager secret; however, this would defeat the purpose of the public/private key system.

Figure 1:
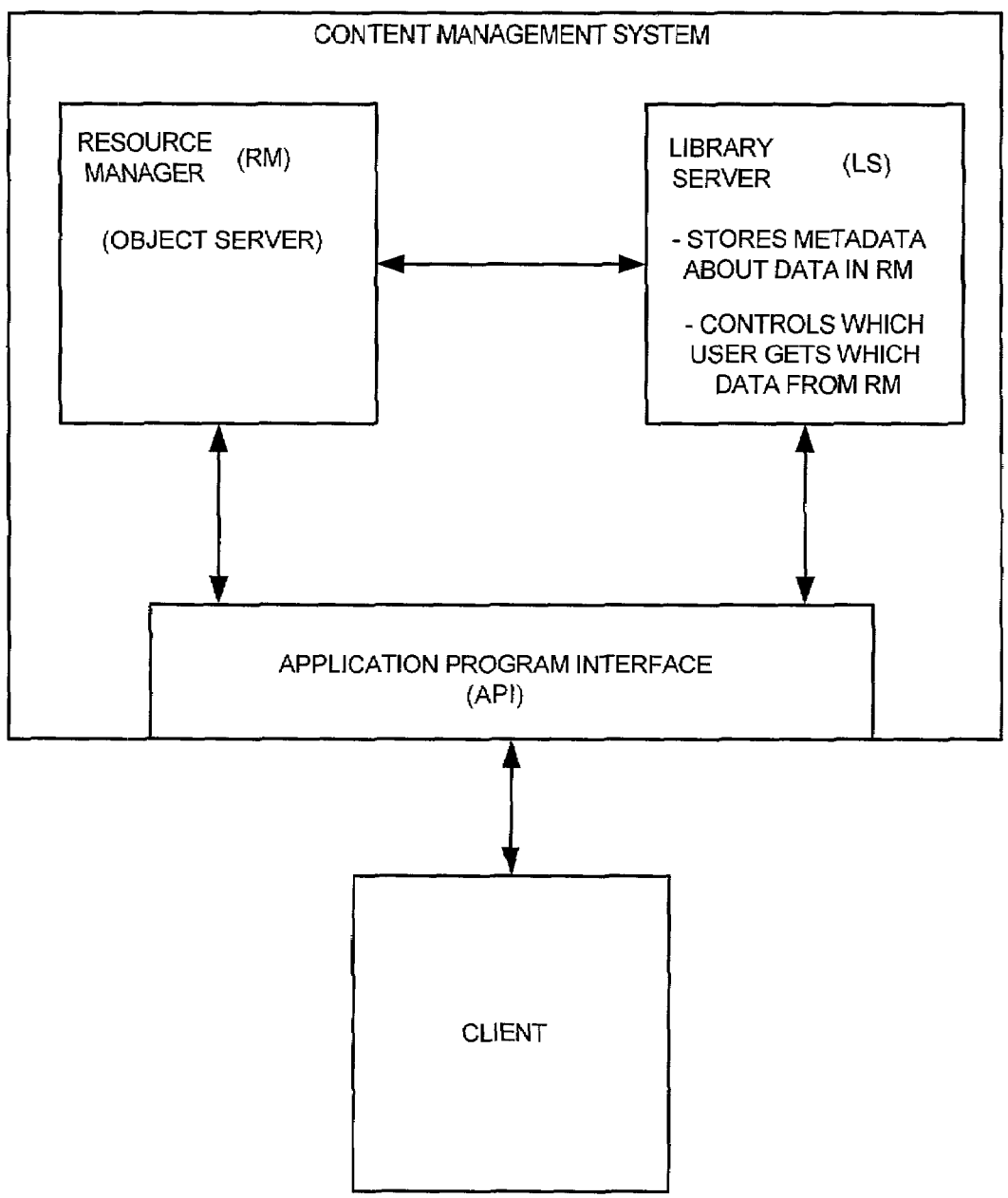
FIG. 1 is a high level block diagram of a conventional content management system showing both server and client.
Figure 2:
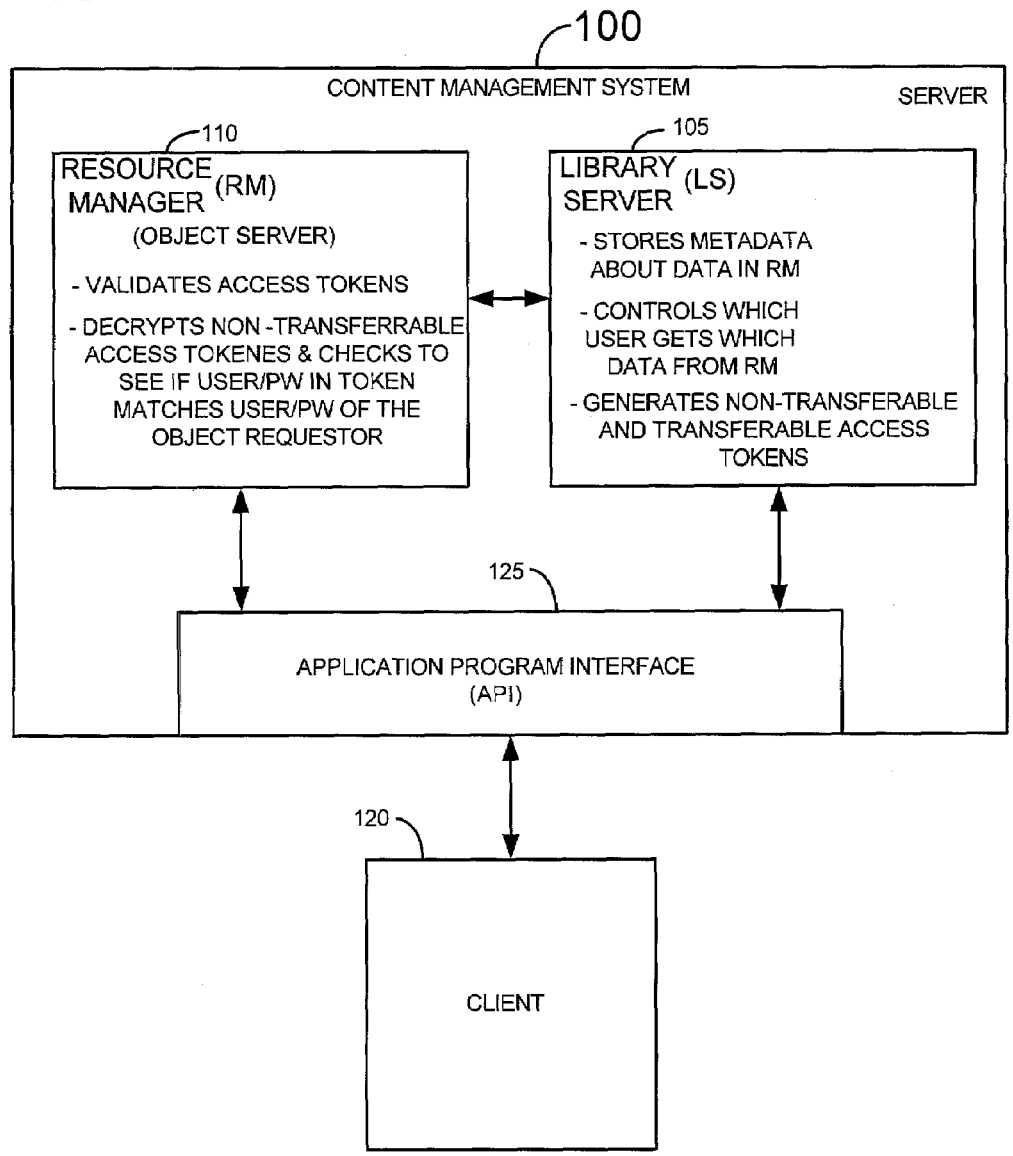
FIG. 2 is a block diagram of the disclosed content management system.

FIG. 2 is a block diagram of the disclosed content management system 100 which solves the above discussed security problems. Content management system 100 includes a library server 105 which is coupled to one or more resource manager servers (object servers) such as server 110. Library server 105 stores metadata concerning the data or objects stored in resource manager 110. Resource manager 110 is a repository of data or objects which a user at client computer (client) 120 can request. Client 120 is coupled via an application program interface (API) 125 to both library server 105 from which it receives access tokens and to resource manager 110 to which it sends information requests and associated access tokens.

Figure 3:
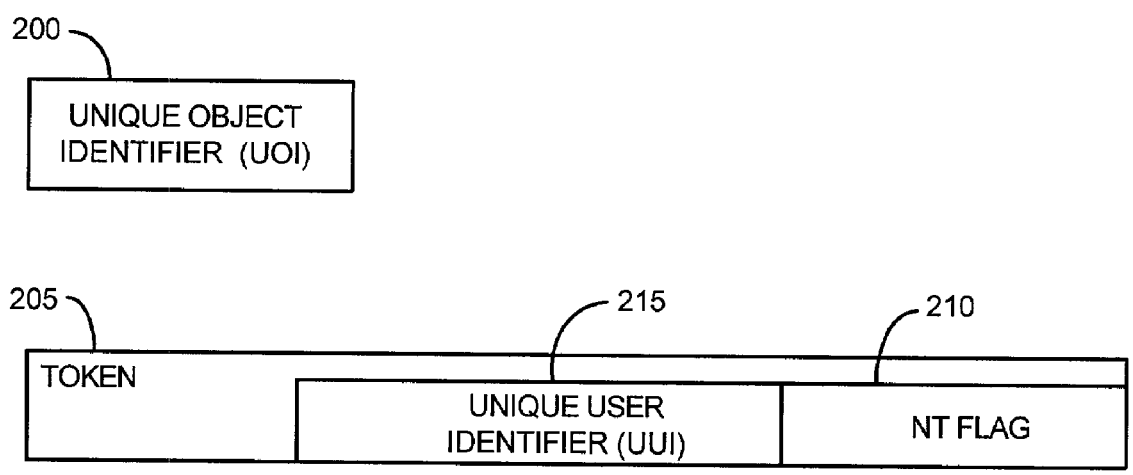
FIG. 3 is a representation of an access token employed in one embodiment of the disclosed content management system.

To access information, a user at client 120 invokes a client API (for example, GetItem, UpdateItem, etc.) which is sent to library server 105 via API 125. This is a request for access to specific information or objects stored in resource manager 110. If the user has the privilege to access the requested object(s), library server 105 generates a unique object identifier 200, such as a Universal Resource Locator (URL), and an associated access 205 token is depicted in FIG. 3. Unique object identifier 200 contains address information relating to the location of the requested information in resource manager 110 so that the information can be later located on request by client 120. Unique object identifier 200 and respective access token 205 are both transmitted back to client 120.

Library server 105 is capable of generating two kinds of access tokens, namely transferable tokens and non-transferable tokens. If a third party acquires a transferable access token and the respective unique object identifier, then that person is able to request and obtain the information associated with that unique object identifier in resource manager 110. However, if a third party somehow acquires a non-transferable access token and the respective unique object identifier, that person is unable to obtain the corresponding data or object in resource manager 110. Security is thus substantially enhanced.

FIG. 3 depicts an access token which can be either transferable or non-transferable depending on its configuration. If the token is transferable then NT flag 210 is not set and a unique user identifier (UUI) 215 is not required. However if the token is to be non-transferable, then NT flag 210 is set and unique user identifier 215 is included in the token. More particularly, if the token is to be non-transferable the user is prompted to input the user's name and a password. In one approach, library server 105 can prompt the user to input the user's name (username) and password. Alternatively, the username/password pair can be obtained from a connection handle which captures connection information between client 120 and library server 105. In other words, if client 120 needs to log into library server 105 using a username/password pair, then the same username/password pair can be encrypted and used in the access token. In both cases library server 105 encrypts the user's name and password and places them in the unique user identifier 215 in the non-transferable token along with permission information. The access token is then returned to client 120 along with the unique object identifier (or UOI) 200 corresponding to the object stored in resource manager 110. A universal resource locator (URL) may be employed as UOI 200.

When the user desires to access an object stored in resource manager 110, the user sends the token 205 along with the associated unique object identifier 200 to resource manager 110. When resource manager 110 receives a request with a non-transferable token, it prompts the user to provide the username and password using a secure (private) connection. The user then provides the username and password to client 120 which passes it to resource manager 110. Resource manager 110 then decrypts the access token and compares the username/password contained therein with the username/password supplied directly by the current user. If the access token is valid for the identified object and the username/password pair supplied by the user matches decrypted from the token, the user is granted permission to perform the action specified by the token, for example to obtain the information object located at the unique object identifier. Otherwise, the request is denied.

Advantageously, an unauthorized user will not be able to access the object even when a valid access token for that object is presented. To obtain the object, the user must input the correct username/password pair. For subsequent requests from the same user from the same client 120, the user need not be re-authenticated. As part of username/password authentication, an encrypted ID or cookie including the client IP address, username, and password is generated by resource manage 110 and stored in client 120. An expiration time is stored along with the encrypted ID or cookie. Before the cookie expires, requests to the same resource manager 110 from the same client 120 will include the cookie in the request for an object. Resource manager 110 extracts the username/password pair from the cookie and compares that pair with the username/password pair in the access token. Since the client IP address is stored as part of the cookie on the client 120, a stolen cookie that is submitted to the resource manager from a different client machine by a different user will not pass the resource manager's authentication process. One advantage of the cookie being encrypted is that other users of the client machine cannot read IP address, username and password information from the cookie file.

The disclosed non-transferable token authentication process permits resource manager 110 to verify that the user who is presenting the token is the real owner of the token. Desirably, the process enables verification of token and owner without requiring that each resource manager maintain a copy of usernames and passwords stored on the library servers. Moreover, verification of the token owner need only be performed once for each user on a client machine within a predetermined time defined by the resource manager administrator and recorded in the aforementioned cookie stored on the client machine. To reduce processing overhead, multiple requests from the same user and the same client machine share one user verification before the time expires.

The disclosed non-transferable access token methodology can also operate with somewhat reduced security when client-server data channel privacy is not employed if so desired. While the earlier described embodiment employed a secure communication channel between client 120 and content management system 100, it is possible to employ an unsecure channel instead. Usage of such an unsecure communication channel would mean that the username/password pair is transmitted in the clear and is thus be subject to eavesdropping. However, in such a non-transferable access token embodiment, substantial security is still provided because an unauthorized user would need to steal and match both the access token and the username/password pair in order to breach the security of the content management system.

Figure 4:
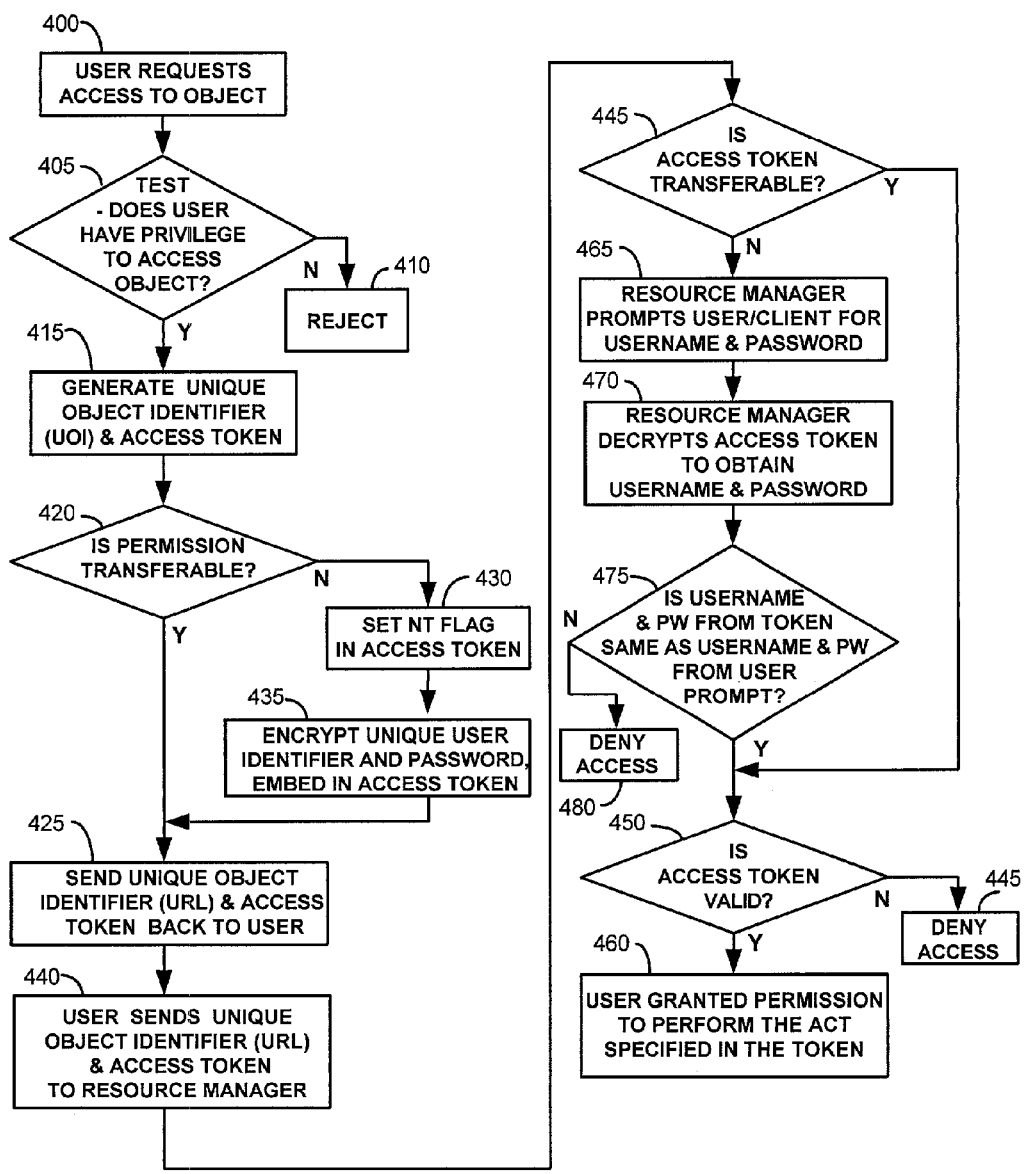
FIG. 4 is a flow chart depicting process flow in the disclosed content management system.

FIG. 4 is a flowchart which depicts process flow of the disclosed content management technology employing either a transferable or a non-transferable access token. A user logs on to client 120 and requests access to an object stored in resource manager 110 as per step 400. A test is conducted by library server 105 at step 405 to determine if the user possesses the privilege of accessing the requested object. If the user does not have that privilege, access is denied as per rejection step 410. However, if the user does have the privilege of being permitted access to the requested object, then the library server generates a unique object identifier, UOI (such as a universal resource locator, URL) and an associated access token as per step 415.

A test is then conducted at decision block 420 to determine if permission is transferable from one user to another. If permission is transferable then the library server sends a unique object identifier and corresponding access token back to the user as per block 425. However, if permission is to be non-transferable, then the NT flag is set in the access token generated by the library server as per step 430. A unique user identifier (or username) and password are encrypted and embedded in the access token as per step 435. Process flow then continues to step 425 where the unique object identifier and the access token are sent back to the user at the client machine.

When the user desires to access the particular object in the resource manager, the user sends the unique object identifier and access token to the resource manager as per step 440. The resource manager conducts a test at step 445 to determine if the access token is transferable by checking the NT flag of the token. If the NT flag is found not to be set, then the access token is transferable and process flow continues to decision block 450 at which a test is conducted to determine if the access token is valid for the particular requested object or data. If the token is not valid for that object, then access is denied as per step 455. However, if the access token is valid for the requested object, then the user is granted permission to perform the act specified in the token as per step 460. In this scenario, since the access token is transferable, any user may use the access token to obtain the corresponding data object from the resource manager.

However, if the access token is found to be non-transferable in step 445 there is a very different result. More particularly, if the NT flag is found to be set, then the access token is determined to be non-transferable and process flow continues to step 465. At step 465 the resource manager prompts the user/client for a username and password which the user then provides to the resource manager. The resource manager decrypts is the access token to obtain the username and password as per step 470. A test is then conducted by the resource manager at decision block 475 to determine if the decrypted username/password pair obtained from the token is the same as the username/password pair obtained from the user prompt. If the username/password pairs do not match, then access to the object is denied as per step 480. However, if the username/password pairs do match, then process flow to decision block 450 at which a determination is made as to whether or not the non-transferable access token is valid for the particular object. If the token is invalid for that object, access is denied as per step 455. However, if the access token is valid for the particular object, then as per step 460 the user is granted permission to perform the act specified in the token, for example to retrieve the data in the particular object.

As discussed earlier in the case of a non-transferable access token, when the client or user accesses the resource manager (object server) via a browser on the client, the access token with username and password is sent to the resource manager. This can be accomplished by the following mechanisms. The encrypted access token can be included directly in unique object identifier 200 (such as a URL). However, the username/password pair is preferably separated from the unique object identifier. Otherwise, it would be simple for the user to transfer the token along with their username/password pair to a different user. To prevent this from occurring, the content management system can use cookies to store the user's information. If the user chooses to turn off cookies on the browser at client machine 120, then the user will be prompted to input their username and password each time they access the resource manager. Alternatively, state information for HTTP can also be maintained by using URL rewriting or including the username and password in the URL returned from the library server as mentioned earlier.

Referring back to FIG. 2, in one embodiment, content management system 100 behaves in the following manner when the client 120 accesses the resource manager/object server 110 for the first time after receiving the access token from library server 105. The user employs a browser on client machine 120 to access resource manager/object server 110 by sending server 110 the unique object identifier (UOI) received from library server 105. This request for information is sent to server 110 via a communications network, for example wire-connected HTTP. No cookie is attached to the request in this particular embodiment. Resource manager/object server 110 receives the request from the client and finds that there is no cookie. In response, server 110 generates a form that includes the original UOI (which could be a URL) in a hidden field along with fields for the user to fill in the username and password. Server 110 sends this form to client 120 via a new secure connection, such as secure HTTP (HTTPS) for example. Server 110 connects to the browser client 120 via a separate connection, for example asynchronous HTTP supported by HTTP 1.1.

Client 120 receives the form and the user fills in the requested username and password information. The completed form is transmitted by the client back to server 110 over the secure HTTPS network link. Server 110 validates the received information and then retrieves the contents associated with the requested UOI which is then returned to the client in the form. Server 110 generates a request to set a cookie on client 120. More particularly, server 110 returns to client 120 the requested data or object via the original HTTP network connection and also posts a set cookie request to the client. The cookie is then set in the client browser if cookies are enabled in the browser.

In an alternative embodiment, if asynchronous HTTP is not supported by either resource manager/object server 110 or client 120, the following steps are followed. The user employs a browser on client machine 120 to access resource manager/object server 110 by sending server 110 the unique object identifier (UOI) received from library server 105. This request for information is sent to server 110 via a communications network, for example wire-connected HTTP. No cookie is attached to the request in this particular embodiment. Resource manager 110 receives the request from the client and finds that there is no cookie. Resource manager 110 generates a form that includes the original UOI in a hidden field along with fields for the user to fill in username and password. The generated form is sent to client 120 as a response to the client via HTTP. Client 120 receives the form and the user fills in the requested username and password information. Client 120 then sends the completed form back to resource manager 110 via HTTPS (secure). Resource manager 110 validates the received information and retrieves the contents associated with requested UOI. These contents are then returned in the form. Resource manager 110 also prepares a request to set a cookie on client 120. Resource manager 110 then transmits the requested object back to the client and also posts a set cookie request to the client's browser via HTTPS (secure). The cookie is then set in client 120 if cookies are enabled in its browser.

In more detail, the cookie that resource manager/object server 110 attempts to set on the client's browser contains the following information. The cookie includes the username/password encrypted using a private key known only to resource manager/object server 110. Resource manager 110 has a public key which is known to the client's browser. The cookie also includes the relevant domain and the expiration date/time of the cookie.

For subsequent requests to resource manager/object server 110 for additional data or objects before the cookie expires, the following actions occur. Client 120 employs its browser to access resource manager 110 and request the object at the UOI received from library server 105. The request is sent by client 120 to resource manager 110 via HTTP. The cookie is now attached automatically to this request by the client's browser. Resource manager 110 receives the request, decrypts the username and password therein and compares them to the username and password in the access token. If the username/password pairs match, then the requested object is returned to client 120.

The content management system can be stored on virtually any computer-readable storage media, such as CD, DVD and other magnetic and optical media in either compressed or non-compressed form. Of course, it can also be stored on a server computer system or other information handling system.

The disclosed methodology and apparatus enhance security by controlling access to objects stored in a content management system. Access tokens are prevented from being employed by users other than the original client user when such restricted access is desired. The system can alternatively provide non-transferable access tokens when heightened security is desired or provide transferable access tokens when security is less of a concern.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. A computer program product for organizing information in a content management system, the computer program product including a plurality of computer executable instructions stored on a computer readable medium, wherein the instructions, when executed by the content management system, cause the system to perform the steps of:

receiving, by the system, a request from a client user for an object stored in the system;

generating, by the system, a unique object identifier associated with the requested object;

generating, by the system, a non-transferable access token comprising information associated with object access privileges to which the client user is entitled and unique information associated with the client user, wherein the unique information associated with the client user comprises at least one username and at least one password, the unique information used to permit only the client user to utilize the non-transferable access token, the non-transferable access token being coded with information unique to the client user such that when submitted to the system by a user other than the client user, the system denies access to the requested object;

receiving, by an object server associated with the system, an encrypted connection from a web browser associated with the client user;

receiving, over the encrypted connection, non-transferable authentication information corresponding to the at least one username and the at least one password;

decrypting at least a portion of the non-transferable access token, the portion representing the unique information associated with the client user;

determining whether the at least one username and the at least one password match the decrypted portion of the non-transferable access token resulting in a transfer determination;

validating the non-transferable access token with a library server associated with the system if the transfer determination shows that the non-transferable access token has not been transferred, the validating step resulting in a token validation; and granting the client user access to the requested object based upon the token validation.

2. The computer program product of claim 1, wherein the step of receiving the at least one username and the at least one password further comprises determining whether the web browser associated with the client user is presenting a unique information cookie to the object server that includes the unique information regarding the client user and, if the unique information cookie is not presented, redirecting the web browser associated with the client user to a password form that comprises a unique object identifier associated with the requested object in a hidden field within the password form, and wherein the password form further comprises non-hidden input fields for the at least one username and the at least one password.

3. The computer program product of claim 1 further including instructions for setting a non-transferable flag in the access token to indicate that the access token is non-transferable to a user other than the client user.

4. The computer program product of claim 1 further including instructions for querying the client user for username and password.

5. The computer program product of claim 4 further including instructions for encrypting the username and password to provide an encrypted username and encrypted password.

6. The computer program product of claim 5 further including instructions for embedding the encrypted username and encrypted password in the non-transferable access token.

7. The computer program product of claim 6 further including instructions for transmitting to the system, by the client user, an object request including the unique object identifier and the non-transferable access token.

8. The computer program product of claim 7 further including instructions for prompting, by the system, the client user for username and password to provide a prompted username and prompted password.

9. A method of organizing information in a content management system, the method comprising the steps of:

receiving, by the system, a request from a client user for an object stored in the system;

generating, by the system, a unique object identifier associated with the requested object;

generating, by the system, a non-transferable access token comprising information associated with object access privileges to which the client user is entitled and unique information associated with the client user, wherein the unique information associated with the client user comprises at least one username and at least one password, the unique information used to permit only the client user to utilize the non-transferable access token, the non-transferable access token being coded with information unique to the client user such that when submitted to the system by a user other than the client user, the system denies access to the requested object;

receiving, by an object server associated with the system, an encrypted connection from a web browser associated with the client user;

receiving, over the encrypted connection, non-transferable authentication information corresponding to the at least one username and the at least one password;

decrypting at least a portion of the non-transferable access token, the portion representing the unique information associated with the client user;

determining whether the at least one username and the at least one password match the decrypted portion of the non-transferable access token resulting in a transfer determination;

validating the non-transferable access token with a library server associated with the system if the transfer determination shows that the non-transferable access token has not been transferred, the validating step resulting in a token validation; and granting the client user access to the requested object based upon the token validation.

10. The method of claim 9, wherein the step of receiving the at least one username and the at least one password further comprises determining whether the web browser associated with the client user is presenting a unique information cookie to the object server that includes the unique information regarding the client user and, if the unique information cookie is not presented, redirecting the web browser associated with the client user to a password form that comprises a unique object identifier associated with the requested object in a hidden field within the password form, and wherein the password form further comprises non-hidden input fields for the at least one username and the at least one password.

11. The method of claim 9 further comprising setting a non-transferable flag in the access token to indicate that the access token is non-transferable to a user other than the client user.

12. The method of claim 9 further comprising querying the client user for username and password.

13. The method of claim 12 further comprising encrypting the username and password to provide an encrypted username and encrypted password.

14. The method of claim 13 further comprising embedding the encrypted username and encrypted password in the non-transferable access token.

15. The method of claim 14 further comprising transmitting to the system, by the client user, an object request including the unique object identifier and the non-transferable access token.

16. The method of claim 15 further comprising prompting, by the system, the client user for username and password to provide a prompted username and prompted password.

* * * * *